United States Patent
Stevens et al.

[11] 3,748,580
[45] July 24, 1973

[54] ELAPSED TIME AND TERMINAL SPEED COMPUTER FOR AUTOMOTIVE VEHICLES

[75] Inventors: Harry S. Stevens, Kansas City; Jerry W. Karr, Pleasant Hill; Dennis D. Miller, Buckner; Forrest H. Ballinger, Grain Valley, all of Mo.

[73] Assignee: Harmon Electronics, Inc., Grain Valley, Mo.

[22] Filed: Nov. 13, 1970

[21] Appl. No.: 89,263

[52] U.S. Cl. .................. 324/178, 324/162, 324/174, 235/92
[51] Int. Cl. ............................................. G01p 3/42
[58] Field of Search ............ 324/160, 162, 178–180, 324/186, 166, 168, 171, 173–175, 158 MG; 235/92 A, 92 T, 104, 105.2, 151.32; 58/39.5, 152 E, 145; 73/514, 518, 519; 340/262,263

[56] References Cited
UNITED STATES PATENTS

| | | | |
|---|---|---|---|
| 3,530,382 | 9/1970 | Liston | 324/178 |
| 3,125,884 | 3/1964 | Davies | 324/162 |
| 3,525,044 | 8/1970 | Richmond | 324/173 |

OTHER PUBLICATIONS

J. M. Shulman, "Accurate Tachometry Methods with Electronic Counters", Communications and Electronics, November, 1954, pp. 452–455.

*Primary Examiner*—Michael J. Lynch
*Attorney*—D. A. N. Chase

[57] ABSTRACT

A speed and elapsed time computer has a digital display in view of the driver of an automotive vehicle. A row of selector switches permits the driver to select one of several modes of operation, including "speedometer," "terminal speed," and "elapsed time." A magnetic pickup senses the rotation of an undriven wheel, and wheel pulses are produced in response to the sensed rotation. In the elapsed time mode, timing signals from a time base oscillator are counted from the time the vehicle leaves a standing start until a number of wheel pulses have been produced corresponding to a predetermined distance, such as a quarter mile. At the end of the run, the elapsed time is displayed; the driver may then operate the terminal speed switch and the speed reached at the end of the quarter is displayed. Speed is computed from the period of a wheel revolution obtained from the wheel pulses, and from the number of pulses produced by the vehicle in traversing a given distance, which may also be a quarter mile. In the speedometer mode, the speed computer operates continuously and its output is continuously displayed. Calibration of the apparatus is readily accomplished by a calibration mode which is also selectable by the operator, in which mode the vehicle is driven over a measured course to determine the number of wheel pulses produced, in order that this characteristic of the particular vehicle may be preset into the computer.

12 Claims, 9 Drawing Figures

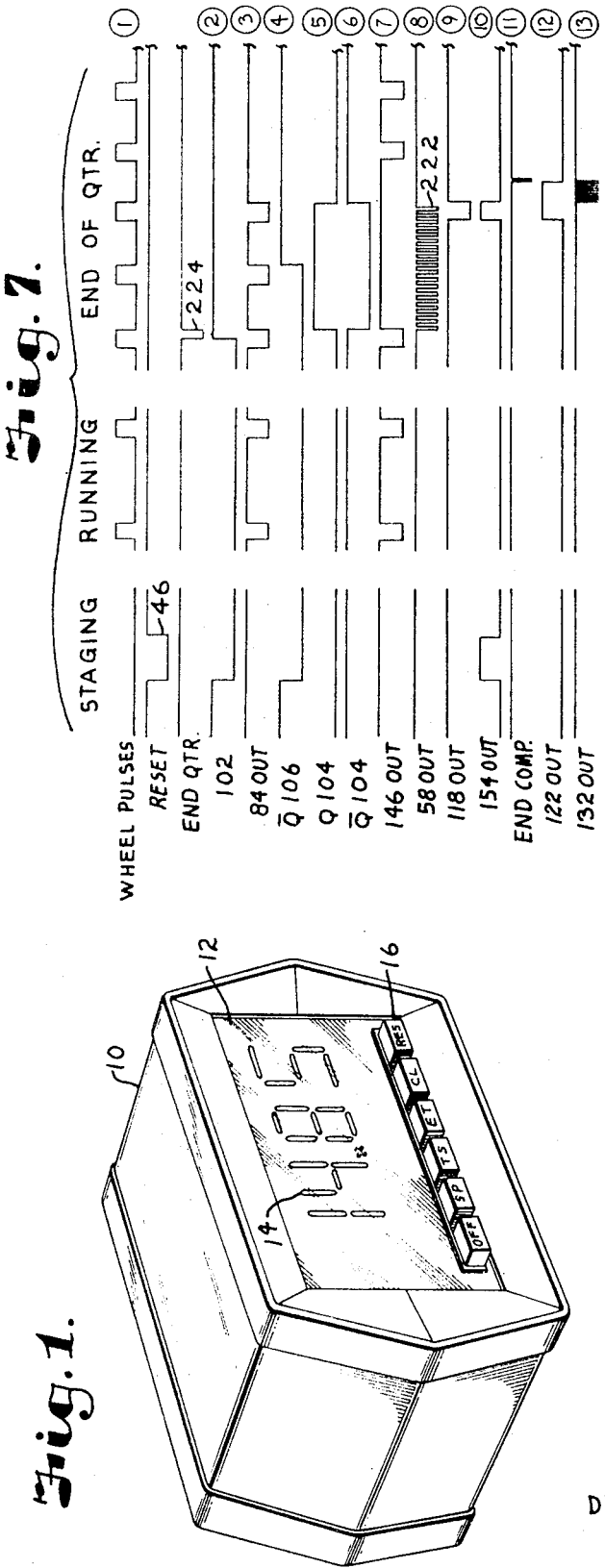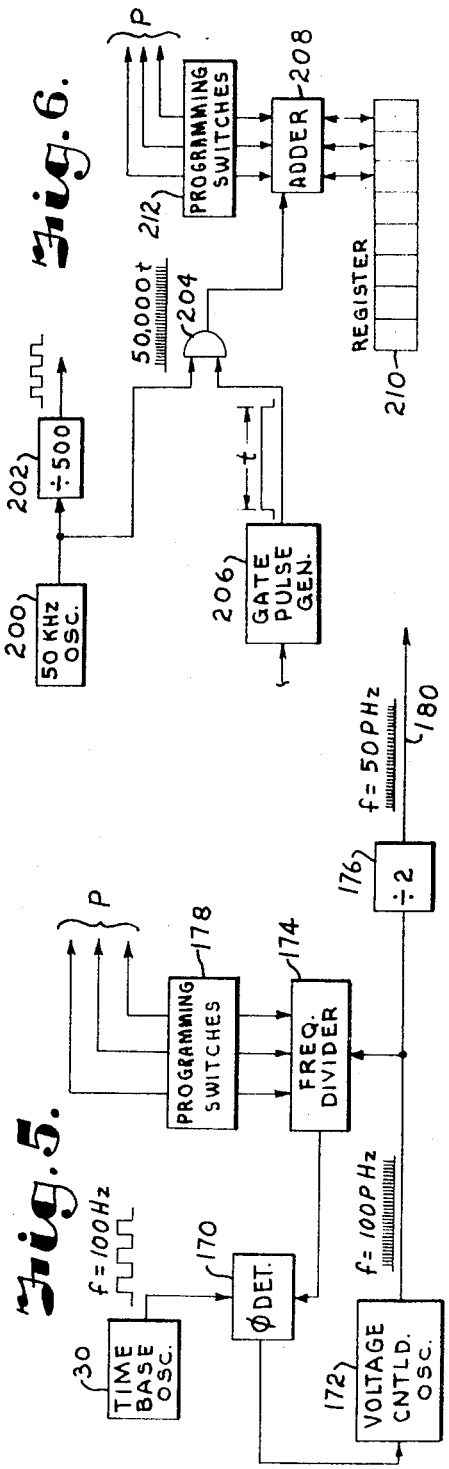

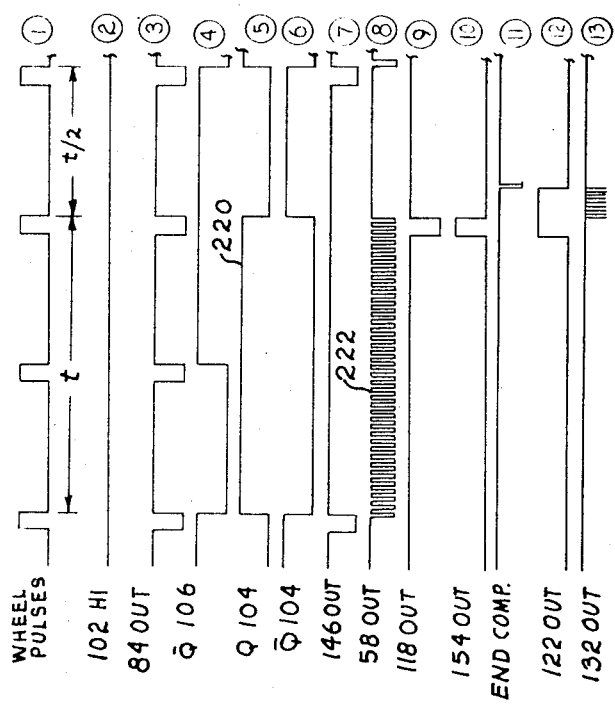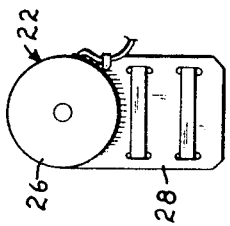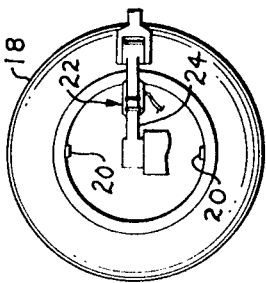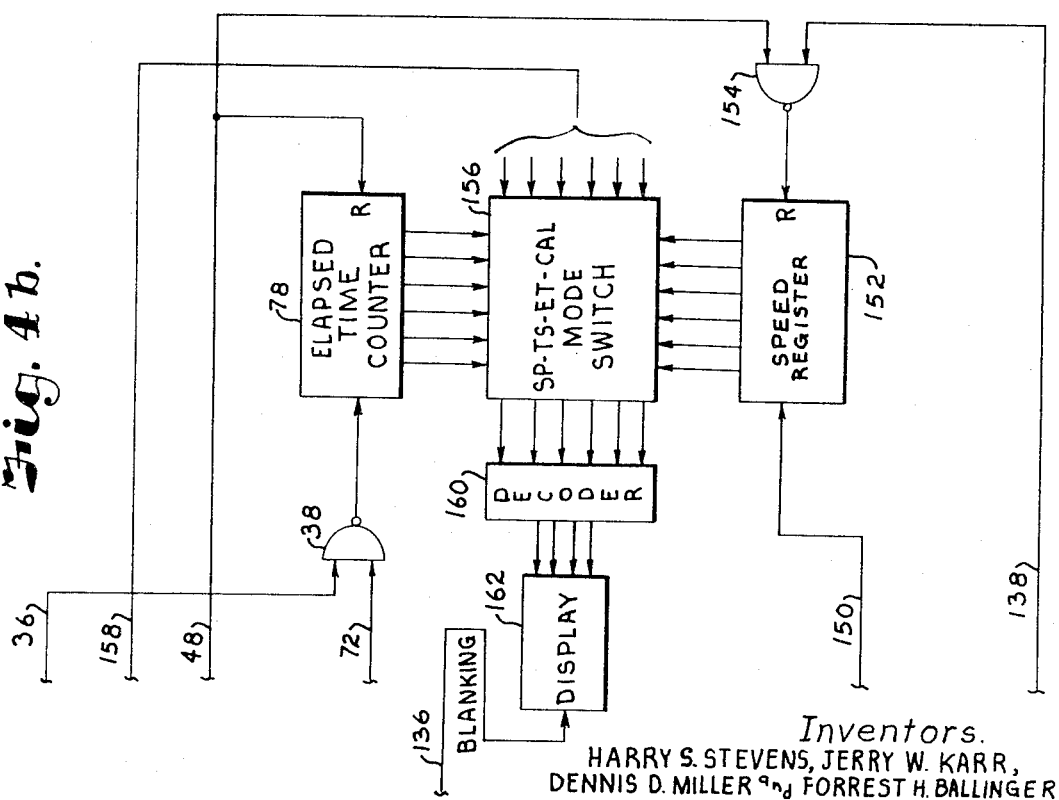

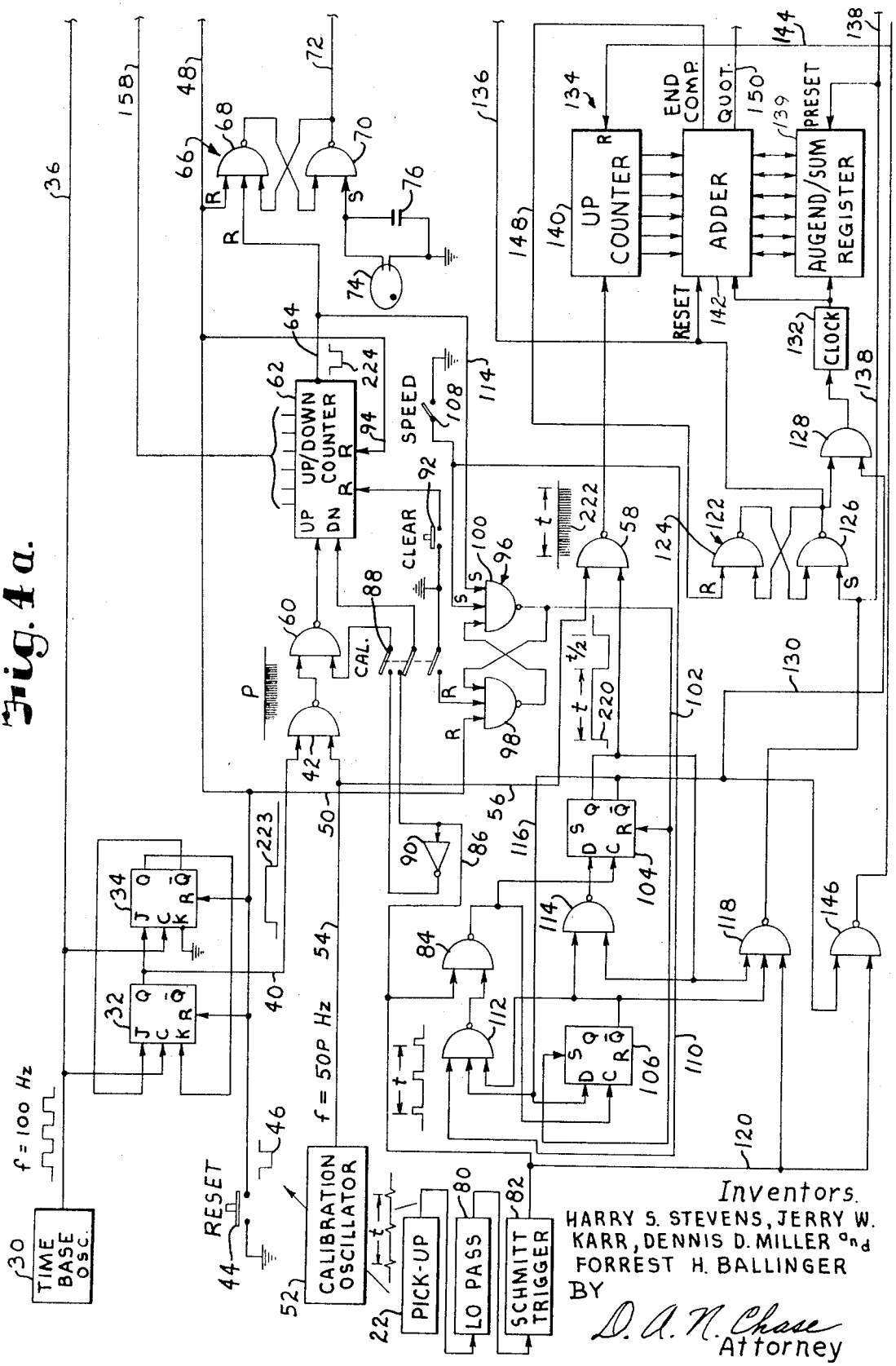

ELAPSED TIME AND TERMINAL SPEED COMPUTER FOR AUTOMOTIVE VEHICLES

This invention relates to a time and speed computer for automotive vehicles, which is contained within and transported by the vehicle and has a digital display for indicating speed continuously, terminal speed, or elapsed time as selected by the operator.

Heretofore, computations relating to the performance of an automotive vehicle have for the most part been performed by equipment permanently installed at a track used exclusively for vehicle testing or racing. The racing enthusiast in particular oftentimes desires accurate timing of the performance of his car during trial runs which may be made when the timing tower of the track is not in operation, or on private tracks or abandoned roads not equipped with any type of timing equipment. Manifestly, corrected speedometers and stop watches may be used and are oftentimes the only means available to measure performance under such conditions, but these devices are inherently subject to error and are inconvenient to use in drag racing runs, for example, where the driver desires to give his undivided attention to operation of the vehicle.

It is, therefore, an important object of the present invention to provide a time and speed computer for automotive vehicles which is contained within the vehicle itself and which measures the performance of the vehicle under actual operating conditions without driver attention during a performance run.

Another important object of the invention is to provide a computer as aforesaid capable of various modes of operation including continuous operation as a speedometer, computation of elapsed time from a standing start over a measured course, and the computation of terminal speed at the end of such course.

Still another important object of the invention is to provide an elapsed time computer in which a train of pulses is produced in response to movement of the vehicle, the number of such pulses being indicative of the distance traveled by the vehicle and the interval between successive pulses being dependent upon the speed of the vehicle, and in which timing signals from a time base oscillator are counted from the time the vehicle leaves a standing start until a number of such pulses have been produced corresponding to the length of the course.

Yet another object of the invention is to provide a speed computer for determining speed continuously or for computing the terminal speed of the vehicle at the end of a measured course, wherein the speed computation is based on the period of a wheel revolution and the number of such revolutions required to traverse a given distance.

Furthermore, it is an important object of this invention to provide a computer as set forth above having a digital display employed to selectively read out either time or speed information, and wherein both elapsed time and terminal speed information are stored within the computer for selective readout by the display after a performance run.

Additionally, it is an important object of the invention to provide such a computer which may be readily calibrated for a particular vehicle by an unskilled operator without special tools or complex procedures, but which nonetheless is highly accurate.

In the drawings:

FIG. 1 is a front perspective view of the computer unit showing the digital display and the push button selector switches;

FIG. 2 is a side elevational view of a steered, undriven wheel of a vehicle showing the pickup device of the present invention;

FIG. 3 is a view of the pickup device itself as seen from the wheel side thereof;

FIGS. 4a–4b is a schematic and logic diagram of the computer;

FIG. 5 is a block diagram showing a modification of the circuitry of FIGS. 4a–4b;

FIG. 6 is a block diagram of another modification of the circuitry of FIGS. 4a–4b;

FIG. 7 is a timing diagram illustrating the operation of the computer in the terminal speed mode; and FIG. 8 is a timing diagram illustrating the operation of the computer in the speedometer mode.

DESCRIPTION — FIGS. 1-6

Referring initially to FIG. 1, a housing 10 is shown in which the computing apparatus of the present invention is contained, the housing 10 being provided with a transparent front panel 12 through which a digital display 14 may be seen. The number displayed in FIG. 1 is 14.85 and refers to an elapsed time of 14.85 seconds. A row of push button selector switches 16 is located along the bottom of the panel 12 and, from left to right, are labeled "OFF," "SP" for speedometer mode, "TS" for terminal speed mode, "ET" for elapsed time mode, "CL" meaning clear, and "RES" meaning reset. The functions of the mode switches and the clear and reset switches will be explained hereinbelow.

Referring to FIGS. 2 and 3, a steered and undriven wheel 18 of a vehicle, such as a car modified for drag racing, is shown provided with a pair of diametrically opposed, permanent magnets 20 mounted on its rim. A pickup device 22 is mounted on the control arm 24 of the wheel 18, and includes a pickup coil housed within a cylindrical, nonmagnetic case 26 carried by a mounting plate 28. Straps or other suitable fasteners are employed to attach the mounting plate 28 to the control arm 24 with the case 26 aligned with the rim of the wheel 18. Accordingly, as each of the magnets 20 passes the pickup coil, an oscillatory impulse is induced therein as is illustrated in FIG. 4a.

The computer logic is illustrated in FIGS. 4a–4b. A crystal controlled, time base oscillator 30 produces a 100 Hz square wave which is fed to the clock inputs C of a pair of JK flip-flops 32 and 34. The square wave provides a series of timing signals which, besides controlling the flip-flops 32 and 34, are fed along a lead 36 to one input of a 2-input NAND gate 38. The flip-flops 32 and 34 are interconnected in a one-shot arrangement, the Q output of the flip-flop 34 being connected to the K data input of the flip-flop 32, while the $\overline{Q}$ output of the flip-flop 34 is connected to the J data input of the flip-flop 32. The K data input of the flip-flop 34 is maintained at the low logic level (as indicated by the ground symbol), and the Q output of the flip-flop 32 is connected to the J input of the flip-flop 34. The output of the arrangement is taken from the Q output of the flip-flop 32, and appears on a lead 40 that extends to one input of a 2-input NAND gate 42. A push button operated reset switch 44, upon operation thereof, places the reset inputs of the flip-flops 32 and 34 at the low logic level as indicated by the reset pulse 46, the latter being transmitted on to other portions of the circuitry by leads 48 and 50. At this juncture, it should be understood that two voltage levels are employed in the present invention in accordance with binary logic, and are referred to herein as the "low" and the "high" logic levels.

A variable frequency calibration oscillator 52 has a square wave output which is delivered along a lead 54 to the other input of the NAND gate 42. A lead 56 connects the lead 54 to one input of a 2-input NAND gate 58, thus both of the gates 42 and 58 receive the output from the calibration oscillator 52. The output of the NAND gate 42 is connected to one input of another 2-input NAND gate 60, the output thereof being connected to the up-counting input of an up/down counter 62. The counter 62 is a synchronous counter having a borrow output 64 connected to a reset input of a set-reset flip-flop 66 comprising a pair of cross coupled NAND gates 68 and 70. The output of the flip-flop 66 is taken at the output of the NAND gate 70 and is at the low logic level when the flip-flop is reset. A lead 72 connects this output to the other input of the NAND gate 38.

The flip-flop 66 is set by the closing of a mercury switch 74 which serves as an inertial switch to sense the motion of the vehicle. A high frequency by-pass condenser 76 is connected across the mercury switch 74 to prevent high frequency ignition noise from triggering the flip-flop. It may be noted that the flip-flop 66 and the JK flip-flops 32 and 34, and type D flip-flops and other set-reset flip-flops to be described hereinafter, are activated by low logic levels at their set and reset inputs.

The NAND gate 38 has its output connected to an elapsed time counter 78. A reset input for the counter 78 is indicated and is connected to the reset lead 48.

The output of the pickup device 22 is fed to a low pass filter 80 for high frequency suppression, the output of the filter 80 being connected to the control input of a Schmitt trigger 82. Accordingly, the output of the Schmitt trigger 82 comprises a train of wheel pulses of rectangular form, two pulses occurring for each revolution of the wheel 18. This pulse train is fed to one input of a 2-input NAND gate 84 and via a lead 86 to a normally closed contact of a 3-pole calibration switch 88. The circuitry is illustrated in condition for either elapsed time or terminal speed operation, hence the calibration switch 88 is shown in its normal, inoperative position where the wheel pulses are conducted through the center pole of the switch 88 to the downcounting input of the counter 62. For calibration purposes, as will be explained, an inverter 90 is connected between the lead 86 and the normally open contact of the uppermost pole of the switch 88, such upper pole being directly connected to the second input of the NAND gate 60.

A push button switch 92 identified by the legend "CLEAR" is connected to a reset input of the counter 62 and, upon closure thereof, grounds such input at the low logic level to clear the register. A second reset input is also provided and is connected to the reset lead 48 by a lead 94, thereby also providing for the clearing of the register when the reset switch 44 is closed.

The lowermost pole of the calibration switch 88 is grounded at the low logic level and has a normally open contact connected to one of the reset inputs of a 2-input set, 2-input reset flip-flop 96 comprising a pair of cross coupled NAND gates 98 and 100. The output of the flip-flop 96 is taken at the output of the NAND gate 100 and is at the low logic level when the flip-flop 96 is reset. A lead 102 connects this output to the reset input of a type D flip-flop 104 and to the set input of a type D flip-flop 106. The flip-flops 104 and 106 are interconnected in a divide-by-3 configuration.

A single pole switch 108 is identified by the legend "SPEED" and, upon closure thereof, places one of the set inputs of the flip-flop 96 at the low logic level. Simultaneously, via a lead 110, one of the inputs of a 3-input NAND gate 112 is placed at the lower logic level. The other set input of the flip-flop 96 is connected by a lead 114 to the output 64 of the up/down counter 62. The lead 50 extending from the reset lead 48 is connected to the remaining reset input of the flip-flop 96. It should be understood that the SPEED switch 108 is used to place the apparatus in the speedometer mode and corresponds to the SP push button shown in FIG. 1. The CLEAR switch 92 and the RESET switch 44 likewise correspond to the CL and RES push buttons respectively.

The other two inputs of the NAND gate 112 are respectively connected to the $\overline{Q}$ output of flip-flop 104 via lead 116 and the $\overline{Q}$ output of the flip-flop 106. The output of the NAND gate 112 is connected to the second input of the NAND gate 84, the output thereof being fed to the clock inputs C of the flip-flops 104 and 106. A 2-input NAND gate 114 has one of its inputs connected to the $\overline{Q}$ output of the flip-flop 106, its other input connected to the Q output of the flip-flop 104, and its output connected to the data input D of the flip-flop 104. The data input D of the flip-flop 106 is connected via lead 116 to the $\overline{Q}$ output of the flip-flop 104.

A 3-input NAND gate 118 has one input connected to the Q output of the flip-flop 104, a second input connected to the $\overline{Q}$ output of the flip-flop 106, and its third input connected to a lead 120 extending from the output of the Schmitt trigger 82. The output of the NAND gate 118 is fed to the set input of a set-reset flip-flop 122 comprising a pair of cross coupled NAND gates 124 and 126. The output of the flip-flop 122 is taken at the output of the NAND gate 126 and is fed to one input of a 2-input AND gate 128. The other input of the AND gate 128 is connected to the $\overline{Q}$ output of the flip-flop 104 by a lead 130, the output thereof being fed directly to the activating input of a clock 132 in the computation section 134 of the computer apparatus. A lead 136 is connected to the output of the flip-flop 122 for reset and blanking functions to be discussed.

The output of the NAND gate 118 is also connected via lead 138 to the present input of an augend/sum register 139 in the computation section 134. The computation section further includes an up-counter 140 responsive to the output of the NAND gate 58, and an adder 142. The up-counter 140 has a reset input connected by lead 144 to the output of a 2-input NAND gate 146, the inputs thereof being connected to the $\overline{Q}$ output of the flip-flop 104 and the lead 120 respectively. A lead 148 delivers an end of computation command from the adder 142 to the reset input of the flip-flop 122.

The adder 142 has a quotient output 150 which is connected to the counting input of a speed register 152. The output of a 2-input NAND gate 154 is connected to the reset input of the register 152. The two inputs of the NAND gate 154 are respectively connected to the reset lead 48 and the lead 138.

A mode switch 156 is schematically illustrated in FIG. 4b and has three sets of switching inputs, the first set receiving the output of the elapsed time counter 78, the second set receiving the output of the up/down counter 62 as indicated by the leader 158, and the third set receiving the output of the speed register 152. Any one of these three sets of inputs is selectively switched to a decoder 160 comprising a binary coded decimal to 7-segment decimal display decoder. Accordingly, the output of the decoder 160 is fed directly to suitable numeric display devices 162 of the 7-segment incandescent type, thereby providing the digital display 14 illustrated in FIG. 1.

The modified circuitry illustrated in FIG. 5 is a substitute for the calibration oscillator 52. The output of the time base oscillator 30 in this instance provides a reference frequency and is fed to one input of a phase detector 170. The error signal output of the phase detector 170 is fed to a voltage controlled oscillator 172 having an output connected to a programmable frequency divider 174 and a divde-by-2 network 176. The output of the frequency divider 174 is connected to the other input of the phase detector 170 to provide a phase-locked loop. Programming switches 178 for the frequency divider 174 are set to the number P, a parameter to be discussed under the next heading hereinafter. A coded number equal to the number P is obtainable at the programming switches 178 as indicated. The output replacing the output of the calibration oscillator 52 of FIG. 4a is taken at the output of the divde-by-2 network 176, as represented by the lead 180.

The modification of FIG. 6 eliminates the calibration oscillator altogether and employs a high frequency time base oscillator 200 have a 50 KHz output. A divide-by-500 network 202 then provides the time base frequency of 100 Hz. The output of the oscillator 200 is fed to one input of a 2-input AND gate 204, the other input thereof being connected to the output of a gate pulse generator 206 corresponding to the Q output of the flip-flop 104 in FIG. 4a. The output of the AND gate 204 is fed to an adder 208 that has its output connected to an accumulating register 210 corresponding to the up-counter 140 in FIG. 4a. The adder 208 is set in accordance with the number P through the use of programming switches 212, a coded number equal to P being obtainable at the programming switches 212 as indicated.

THE SPEED COMPUTATION EQUATION

In the discussion under this heading and subsequent headings, it will be assumed for purposes of illustration that all computations are based on vehicle performance and operation over a distance of one quarter mile. It will be understood, of course, that the quarter mile distance is entirely arbitrary from a computational standpoint but is, in fact, useful from a practical standpoint in that, in the case of elapsed time from a standing start in the drag racing field, quarter mile performance is commonly the distance of interest.

If the number of wheel revolutions per quarter mile for a particular vehicle is N, and the period of a wheel revolution at some speed is measured at t in seconds, then speed, in miles per hour $= 900/t \cdot N$.

In the present invention, two pulses are generated for each wheel revolution by virtue of the two diametrically opposed magnets 20 on the rim of the wheel 18. Accordingly, $$N = P/2$$

where P is equal to the number of pulses per quarter mile. Furthermore, it is desired that the computer have sufficient resolution to display speed in terms of tenths of miles per hour. Therefore, multiplying the numerator of the above speed equation by a factor of 1,000 and multiplying the denominator by a factor of 100, the result is speed, in tenths of miles per hour $= 900,000/50 \cdot t \cdot P$.

This speed equation is implemented in the circuitry of FIG. 4a of the present invention by adjusting the calibration oscillator 52 to a frequency of 50P Hz and then gating the oscillator output with a pulse of width $t$, which is equal to the period of one wheel revolution. As will be discussed hereinafter, the pulse of width $t$ appears at the Q output of the flip-flop 104. The resultant number thus obtained is divided into the fixed number 900,000, the quotient being speed in tenths of miles per hour.

OPERATION IN SPEEDOMETER MODE

Beginning from the left, the first four push buttons of the row of selector buttons 16 in FIG. 1 are connected to a mechanical interlock (not shown) so that normally only one of these buttons will be depressed at a time. Assuming that the operator wishes for the computer to continuously display the speed of the vehicle, the SP button is depressed to close the switch 108 (FIG. 4a) and to actuate the mode switch 156 (FIG. 4b) thereby connecting the output of the counter 62 to the decoder 160. Since the flip-flop 96 is activated by the presence of a low logic level at any of its inputs, the flip-flop 96 is set by the closure of the switch 108. This causes its output along lead 102 to change to the high logic level thereby releasing the flip-flops 104 and 106 for continuous operation. At the same time, one of the inputs of the NAND gate 112 is held at the low logic level via lead 110, thus the output of NAND gate 112 will be at the high logic level and remain at such level so that the wheel pulses from the Schmitt trigger 82 will pass through the NAND gate 84 and be continuously applied to the clock inputs of the flip-flops 104 and 106.

Assuming for purposes of illustration that the Q outputs of both of the flip-flops 104 and 106 are at the high logic level, the next wheel pulse reaching the clock inputs causes the Q output of the flip-flop 106 to go low ($\overline{Q}$ high) while the Q output of the flip-flop 104 remains high. On the next succeeding wheel pulse, both Q outputs go low. The next wheel pulse causes both Q outputs to return to the high logic level, and the cycle repeats. Accordingly, it may be appreciated that the Q output of the flip-flop 104 is high for twice as long as it is low. The time duration at the high logic level is equal to t (the period of one wheel revolution) and the time duration at the low logic level is thus equal to $t/2$. This is illustrated in FIG 4a by the wave form 220.

As mentioned previously, the calibration oscillator is at a frequency equal to 50P Hz, where P is the number of wheel pulses produced by the vehicle in traveling a quarter mile. The NAND gate 58 effects the gating function that, in effect, produces a series of pulses representing the denominator in the speed equation discussed hereinabove. The wave form 222 in FIG. 4a represents the output of the NAND gate 58 during the time $t$ of the wave form 220. The wave form 222 comprises a series of speed information signals in the nature of counting pulses equal in number to $50 \cdot t \cdot P$.

The operation of the apparatus in the speedometer mode is further understood with reference to FIG. 8. The first or top graph of the timing diagram illustrates the wheel pulses from the Schmitt trigger 82. The second graph illustrates that the lead 102 is maintained at the high logic level. The third graph shows the output of the NAND gate 84, which is the inverse of the wheel pulses. The fourth graph shows the $\overline{Q}$ output of the flip-flop 106. The fifth and sixth graphs illustrate the Q and $\overline{Q}$ outputs respectively of the flip-flop 104. The seventh graph depicts the output of the NAND gate 146. The eighth graph shows the series of counting pulses delivered at the output of the NAND gate 58. The ninth graph shows the output of the NAND gate 118. The tenth graph shows the output of the NAND gate 154. Graph No. 11 shows the end of computation pulse delivered by the adder 142. Graphs 12 and 13 illustrate the outputs of flip-flop 122 and the clock 132 respectively.

The series of counting pulses from the output of the NAND gate 58 are fed to the up-counter 140. The output of the NAND gate 118 goes low with the occurrence of the wheel pulse whose trailing edge is at the termination of the time t. This triggers the flip-flop 122 to, in turn, reset the adder 142 and place one of the inputs of the AND gate 128 at the high logic level. Shortly thereafter, when the Q output of flip-flop 104 goes high, the AND gate 128 triggers the clock 132 to initiate operation of the computation section 134 of the computer apparatus. At this time, division is performed pursuant to the speed equation discussed above. The augend/sum register 139 stores the complement of 900,000 and is preset to such complement when the output of the NAND gate 118 goes low. During operation of the clock 132, the number stored in counter 140 (the number of counting pulses received from the NAND gate 58) is repeatedly added to such complement until the register 139 fills. The computation then stops and the end computation signal is produced by the adder 142 to reset the flip-flop 122. During the computation, a pulse is produced by the adder 142 and delivered at the quotient lead 150 each time the number in counter 140 is added to the complement in register 139. These quotient pulses are accumulated in the speed register 152. Except during the actual computation period when the display devices 162 are blanked, the count accumulated in the speed register 152 is continuously indicated by the display devices 162. Accordingly, the computation section 134 accumulates counting pulses during a wheel revolution, effects the speed computation at the outset of the following half revolution, and then repeats the cycle so that the speedometer display is updated every one and one-half revolutions of the wheel. It should be understood that the time that the display devices 162 are blanked is sufficiently short to be undetectable by the eye at normal road speeds and above.

OPERATION IN ELAPSED TIME MODE

Selection of the elapsed time mode by the operator is made by pressing the ET button in the row of buttons 16 (FIG. 1). In FIG. 4b this function is illustrated schematically by the mode switch 156 which, in the elapsed time mode, connects the output of the elapsed time counter 78 directly to the input of the decoder 160.

With the vehicle stopped the operator first presses the reset button (RES in FIG. 1) to effect momentary closure of the reset switch 44. The low logic level reset pulse 46 thus produced resets the up/down counter 62 and the elapsed time counter 78. The speed register 152 is also reset so that terminal speed information may also ultimately be obtained, as will be discussed under a subsequent heading. Furthermore, the flip-flops 32 and 34 are reset so that they are now responsive to the timing signals from the time base oscillator 30 appearing at the clock inputs C.

After being reset, the first pulse from the time base oscillator 30 causes the Q output of the flip-flop 32 to change to the high logic level, while the Q output of the flip-flop 34 remains at the log logic level. The second pulse from the time base oscillator 30 causes the Q output of the flip-flop 34 to change to the high logic level, without changing the level of the Q output of the flip-flop 32. The third pulse from the oscillator 30 causes the Q output of the flip-flop 32 to go to the low level, and thereafter subsequent pulses have no effect on the flip-flops 32 and 34 until such time that they are once again reset. Accordingly, the wave form 223 illustrates the output characteristic of the Q output of the flip-flop 32, which is at the high logic level for a time duration commencing with the trailing edge of the first pulse from the oscillator 30 and ending with the trailing edge of the third pulse from the oscillator 30. This time duration is equal to 20 milliseconds and is used to gate the output of the calibration oscillator 52 via the NAND gate 42 so that the output of the NAND gate 42 is a series of pulses equal to the number P. It will be recalled that P is equal to the number of pulses produced by the wheel 18 as it traverses a quarter mile. Since the frequency of the calibration oscillator 52 is 50P Hz, the 20 milliseconds gate causes P pulses to be delivered at the output of the NAND gate 42. These pulses are fed directly to the up-counting input of the up/down counter 62 to preset the number P into the register.

Having reset the apparatus, the operator may then commence the run. As the wheel 18 revolves, wheel pulses are fed to the down-counting input of the counter 62 to reduce the stored count. When the count reaches zero, the vehicle has traveled a quarter mile and an output command pulse 224 appears at the borrow output 64. This resets the flip-flop 66 which was previously set at the beginning of the run by the closing of the mercury switch 74. At the time that the flip-flop 66 was set, its output went high to enable the NAND gate 38 and permit the timing signals from the oscillator 30 to be received by the elapsed time counter 78. Resetting of the flip-flop 66 by the output command pulse 224 disables the gate 38 to, in turn, terminate operation of the counter 78. Accordingly, the display 162 (in one hundredths of a second) holds the elapsed time figure for the quarter mile.

OPERATION IN TERMINAL SPEED MODE

The output command pulse 224 just referred to above also sets the flip-flop 96. Having been reset during the quarter mile run, the flip-flops 104 and 106 were not permitted to respond to the wheel pulses. However, setting of the flip-flop 96 releases the flip-flops 104 and 106 so that the speed of the vehicle will be computed on the next revolution of the wheel 18. The computation proceeds as in the speedometer mode but for one wheel revolution only, the result being held in the speed register 152 where it may be selectively switched to the display devices 162 by operation of the mode switch 156 (pressing the TS button illustrated in FIG. 1).

FIG. 7 is similar to FIG. 8 but illustrates computer operation in the elapsed time or terminal speed mode. The various graphs are numbered to coincide with FIG. 8, two additional graphs being added between Nos. 1 and 2 to illustrate the reset function and the end of quarter command, which is the output command pulse 224 from the up-down counter 62. The first segment of the timing diagram depicts the condition of the system during staging (vehicle stopped in preparation for running the quarter). Here it may be noted that the reset pulse 46 occurs as discussed above. The second segment of the timing diagram depicts the running of the vehicle through the quarter. The third segment of the diagram shows the operation at the end of the quarter, where the command pulse 224 is seen. Note that once the $\overline{Q}$ outputs of both of the flip-flops 104 and 106 are at the high logic level, the flip-flops 104 and 106 do not change state as subsequent wheel pulses are produced. Referring to FIG. 4a, this is because the lead 110 is at the high logic level since the speedometer mode switch 108 is open. Thus, when all three of the inputs of the NAND gate 112 are high, its output goes low and remains at the low level to disable the following NAND gate 84, thereby preventing subsequent wheel pulses from reaching the clock inputs of the flip-flops 104 and 106. Accordingly, only one speed computation is made.

OPERATION IN CALIBRATE MODE

The number of pulses P per quarter mile will vary with each vehicle in accordance with tire sizes and other factors. Accordingly, to calibrate the apparatus the operator actuates the mode switch 156 to cause the output of the up/down counter 62 to be feed to the display devices 162. The 3-pole calibrate switch 88 is also actuated so that wheel pulses will now be fed to the up-counting input of the counter 62. No push button in the row 16 is illustrated for this function in order to minimize the number of buttons. Mechanically, the function may be accomplished through linkage which activates the mode switch 156 and calibrate switch 88 when the TS and ET buttons are simultaneously depressed.

To calibrate, the operator stops the vehicle at the beginning of a measured course, presses the CL button to momentarily close the switch 92 and clear the counter 62, actuates the calibrate switch 88 and the mode switch 156 to the calibrate mode, and then drives the vehicle over the measured course. Once the driver has finished the course, the display devices 162 are read to determine the number of pulses that have occurred. Assuming that such course is a quarter mile in length the readout gives the number of pulses P directly. Having brought the vehicle to a stop at the end of the measured course for calibration purposes, the operator may then momentarily close the reset switch 44 and read from the display devices 162 the number P to which the calibration oscillator 52 is presently set. The output of the inverter 90 is normally at the high logic level, thus the NAND gate 60 is capable of transmitting the gated calibration oscillator output on to the up-counting input of the counter 62. If these two numbers are not the same, the calibration oscillator 52 is adjusted until the number displayed is equal to the number P determined during the calibration run. Changing the oscillator frequency may be easily accomplished by providing a screwdriver adjustment (not shown) accessible from the front of the unit. The apparatus is now properly calibrated for both elapsed time and speed computations.

OPERATION — FIGS. 5 AND 6

In FIG. 5 the programming switches 178 are set to the number P in binary coded decimal form. The frequency divider 174 may, for example, comprise a counter programmable by a binary code and, in this instance, programmed by the switches 178 to divided by the number P. The voltage controlled oscillator 172 will, accordingly, be phase locked at a frequency of 100P Hz, since the phase detector 170 will deliver an error signal at its output whenever its two inputs are not in phase. The out-of-phase condition occurs when the output of the oscillator 172 is other than 100P Hz, since under this condition the signal delivered at the output of the frequency divider 174 has a frequency other than 100 Hz. The desired output, of course, is a signal having a frequency of 50P Hz, this being obtained at the output of the divide-by-2 network 176 and fed directly to the NAND gate 58 shown in FIG. 4a. The function of the NAND gate 42 is eliminated since the number P is now available from the programming switches 178 in parallel form rather than serial form, thus the up/down counter 62 would be directly preset to the number P just after the apparatus is reset.

In FIG. 6 the timing signals are obtained from the output of the divide-by-500 network 202, the output of the 50 KHz oscillator 200 being gated by a pulse of width $t$. Accordingly, the output of the AND gate 204 is a series of pulses equal in number to 50,000$t$. The programming switches 212 are set to the number P in binary coded decimal form. Since the number of pulses appearing at the output of the AND gate 204 and fed to the adder control input is a thousand times the number needed to effect the speed equation discussed above, the adder 208 adds 0.001P to the register 210 each time it receives a pulse at its control input. Accordingly, the register 210 receives a series of speed information signals from the adder 208 and ultimately accumulates a number equal to 50 · $t$ · P, the same as the up-counter 140 in FIG. 4a. Again, P is available in parallel form to preset the up/down counter 62.

Having thus described the invention, what is claimed as new and desired to be secured by Letters Patent is:

1. Apparatus for computing the time required for a vehicle to travel over a course of predetermined length and the terminal speed thereof, said apparatus comprising:

a time base oscillator for producing a series of timing signals occurring at predetermined time intervals;

an elapsed time counter for receiving said signals;

means responsive to movement of said vehicle for producing a train of pulses, the number of which is indicative of the distance traveled by the vehicle and which occur at intervals dependent upon the speed of the vehicle;

control means operably associated with said counter and said movement responsive means for rendering the counter operational at the outset of said course, whereby said timing signals are received and counted by the counter, and for terminating operation of the counter when the number of said pulses thereafter occurring corresponds to the length of said course; and speed computing means coupled with said control means for determining the terminal speed of the vehicle when said number of pulses occurs corresponding to the length of said course.

2. The apparatus as claimed in claim 1,
said control means including means responsive to said pulses for counting the latter and for delivering an output command to effect said termination of counter operation when the number of pulses counted corresponds to the length of said course.

3. The apparatus as claimed in claim 2,
said control means further including gating means for effecting delivery of said timing signals to said elapsed time counter at the outset of said course, said gating means terminating delivery of said signals in response to said command.

4. The apparatus as claimed in claim 1,
said control means including a pulse counter, count presetting means operable prior to operation of said elapsed time counter for causing the pulse counter to store a number representing the number of said pulses corresponding to the length of said course, and means for delivering said pulses to said pulse counter to cause the latter to count from said stored number,
said pulse counter delivering an output command to effect said termination of operation of the elapsed time counter after counting to a state eliminating said stored number.

5. The apparatus as claimed in claim 4,
said control means further including gating means for effecting delivery of said timing signals to said elapsed time counter at the outset of said course, said gating means terminating delivery of said signals in response to said command.

6. The apparatus as claimed in claim 1,
said movement responsive means including a pickup device for sensing the rotation of an undriven wheel of said vehicle, and means responsive to said device for delivering a constant number of said pulses during each revolution of said wheel.

7. The apparatus as claimed in claim 1,
there being readout means for displaying time and speed information; and
switching means coupled with said counter, said speed computing means, and said readout means for selectively connecting the outputs of the counter and the speed computing means with the readout means.

8. Apparatus for computing the speed of a moving vehicle at the end of a course of predetermined length, said apparatus comprising:
first means responsive to rotation of a wheel of said vehicle for producing a train of wheel pulses which have a repetition rate indicative of the period of a wheel revolution;

second means responsive to said wheel pulses for deriving a series of speed information signals having a time duration from the beginning to the end of said series governed by the interval between a pair of said wheel pulses,
said signals having a characteristic indicative of the number of said wheel pulses that occur when the vehicle travels a predetermined distance,
said second means having control means for providing a gate pulse equal in duration to said interval, and means responsive to said gate pulse for delivering said series of speed information signals;
output means coupled with said control means for indicating the speed of the vehicle upon delivery of said signals thereto;
computing means coupled with said first means and responsive to said wheel pulses for determining the instant that the vehicle finishes traveling over said course; and
means responsive to said computing means and coupled with said control means for activating the latter to provide said gate pulse as the vehicle finishes said course, whereby said output means indicates the terminal speed of the vehicle.

9. A method of computing the time consumed by a vehicle in traveling over a course of predetermined length and the terminal speed thereof, said method comprising the steps of:
producing a series of timing signals occurring at predetermined time intervals;
producing a train of pulses in response to movement of the vehicle, the number of which is indicatve of the distance traveled by the vehicle and which occur at intervals dependent upon the speed of the vehicle;
counting said timing signals beginning at the outset of said course and until the number of said pulses thereafter occurring corresponds to the length of said course; and
at the end of said course, deriving the speed of the vehicle from the interval between a pair of said pulses then occurring and said number of pulses corresponding to the length of the course, whereby to compute both the elapsed time in traveling the course and the terminal speed.

10. A method of computing the speed of a moving vehicle at the end of a course of predetermined length, said method comprising the steps of:
producing a train of wheel pulses in response to rotation of a wheel of said vehicle, said pulses having a repetition rate indicative of the period of a wheel revolution;
determining in response to said wheel pulses the instant that the vehicle finishes traveling over said course; delivering a series of speed information signals at said instant having a time duration from the beginning to the end of said series governed by the interval between a pair of said wheel pulses then occurring,
said signals having a characteristic indicative of the number of said wheel pulses that occur when the vehicle travels a predetermined distance; and
mathematically processing said series of signals to derive the terminal speed of the vehicle.

11. The method as claimed in claim 10,
said processing of said series of signals including deriving therefrom a number representing the time required for the vehicle to travel said distance, and dividing the last mentioned number into a fixed number having a value depending upon the expression desired for the quotient.

12. Apparatus for computing the time required for a vehicle to travel over a course of predetermined length, said apparatus comprising:

a time base oscillator for producing a series of timing signals occurring at predetermined time intervals;

an elapsed time counter for receiving said signals;

means responsive to movement of said vehicle for producing a train of pulses, the number of which is indicative of the distance traveled by the vehicle and which occur at intervals dependent upon the speed of the vehicle;

control means operably associated with said counter and said movement responsive means for rendering the counter operational at the outset of said course, whereby said timing signals are received and counted by the counter, and for terminating operation of the counter when the number of said pulses thereafter occurring corresponds to the length of said course, said control means including a pulse counter, count presetting means operable prior to operation of said elapsed time counter for causing the pulse counter to store a number representing the number of said pulses corresponding to the length of said course, and means for delivering said pulses to said pulse counter to cause the latter to count from said stored number, said pulse counter delivering an output command to effect said termination of operation of the elapsed time counter after counting to a state eliminating said stored number;

a calibration switch operable to effect delivery of said pulses to said pulse counter to cause the latter to count from zero as the vehicle travels said course; and means responsive to said pulse counter for displaying the number counted during calibration operation, said count presetting means being selectively operable to set the count stored by said pulse counter prior to timing a run over said course at a value corresponding to the number displayed during calibration operation after traveling said course.

* * * * *